May 15, 1923.
W. G. HOWE ET AL
1,455,206
EXCAVATING MACHINE
Filed July 16, 1920   5 Sheets-Sheet 1
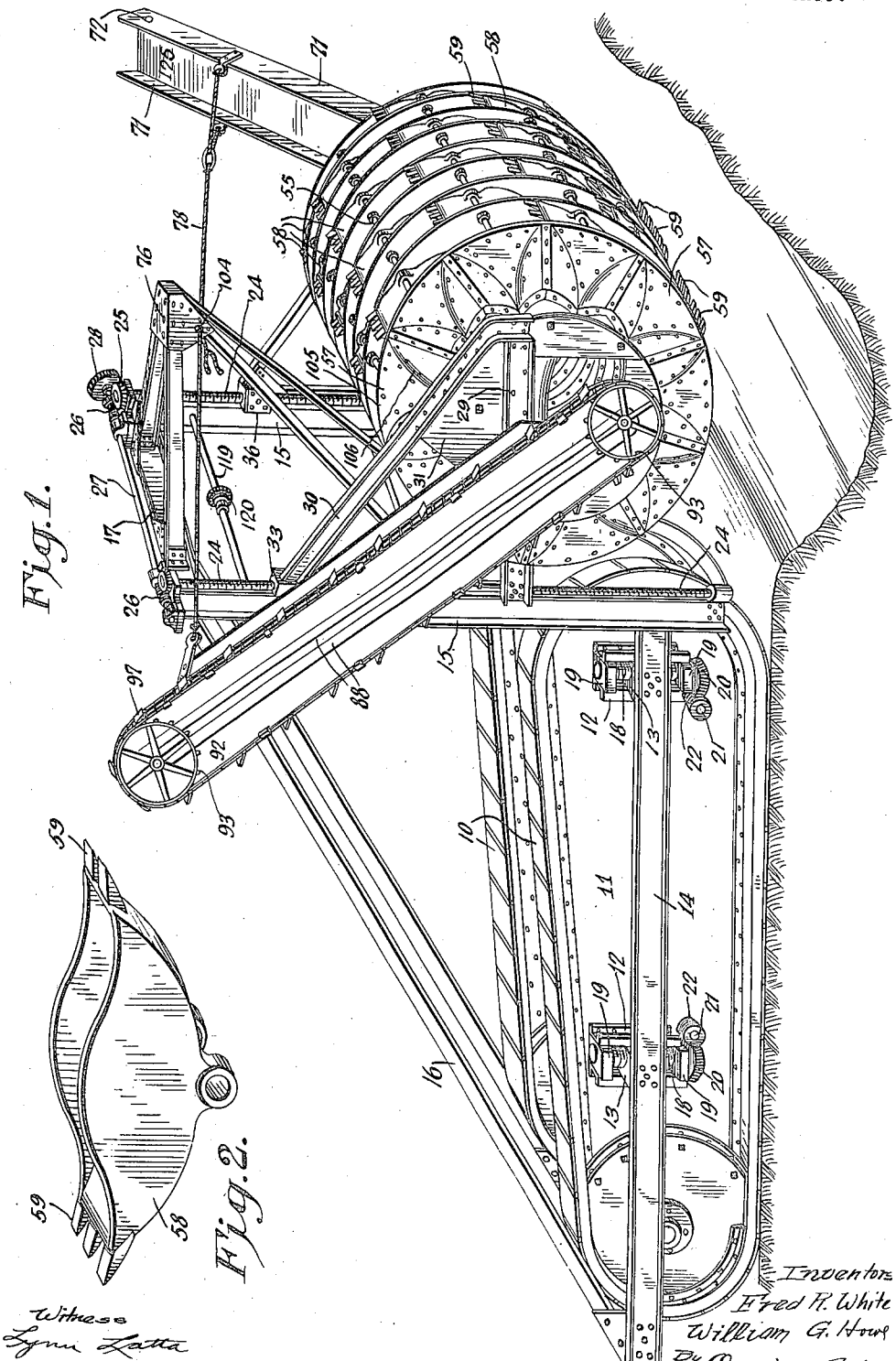

May 15, 1923.
W. G. HOWE ET AL
EXCAVATING MACHINE
Filed July 16, 1920
1,455,206
5 Sheets-Sheet 2
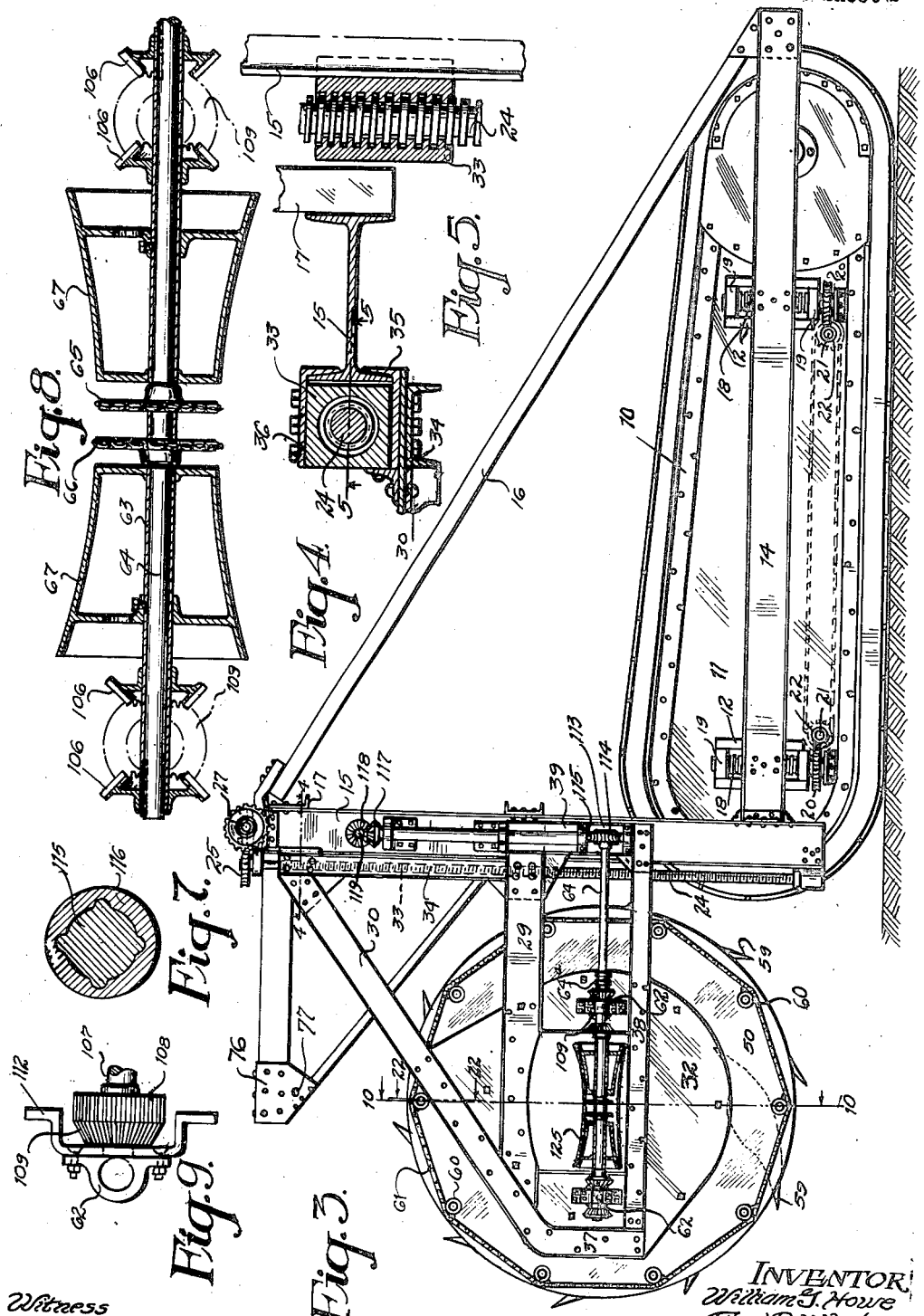

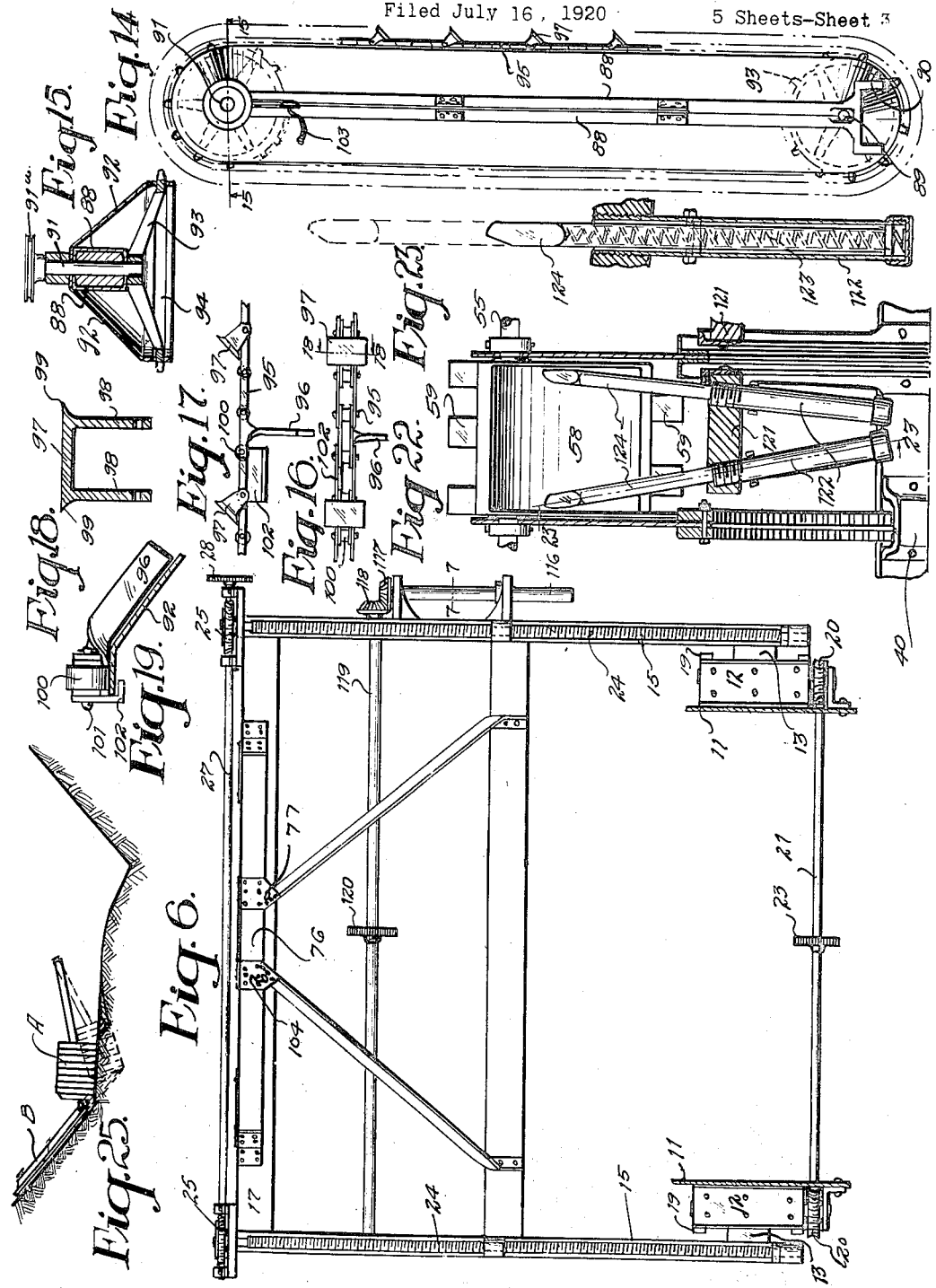

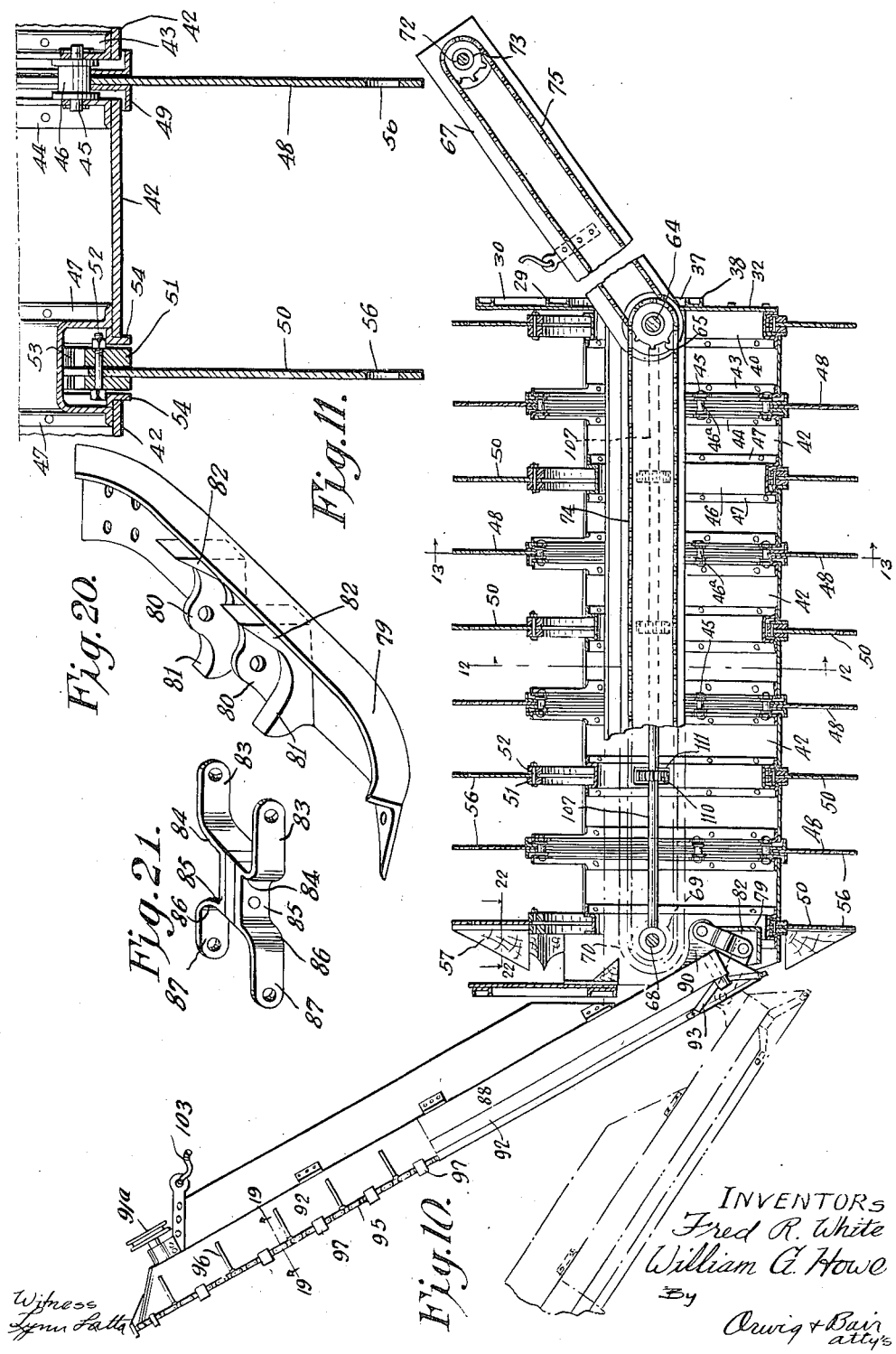

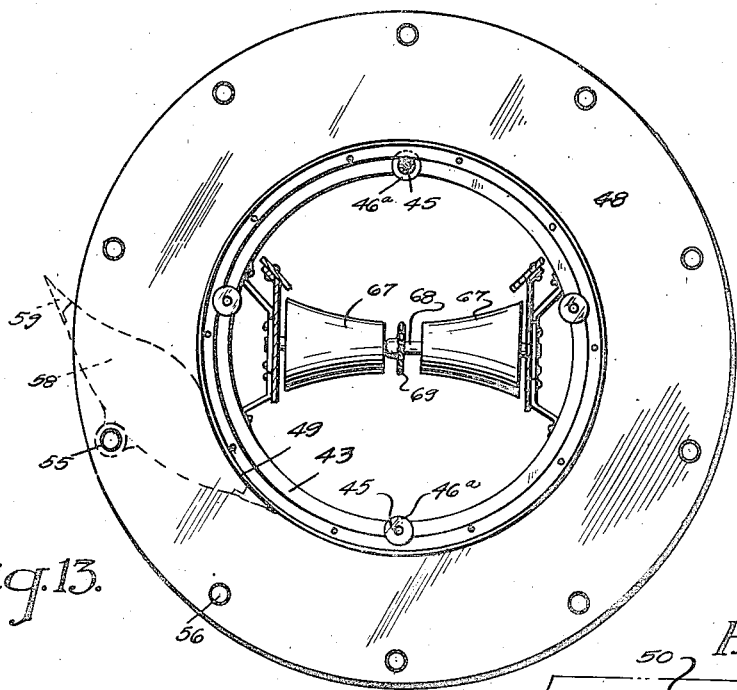
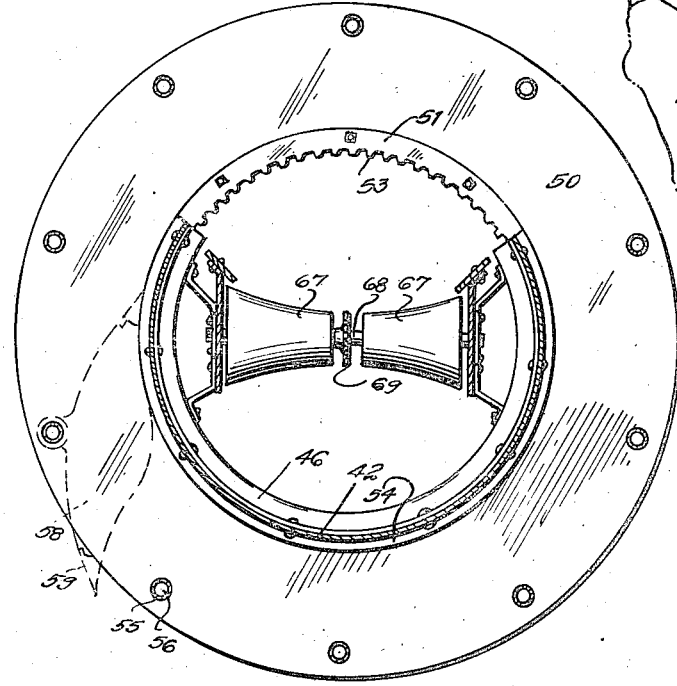

Patented May 15, 1923.

1,455,206

UNITED STATES PATENT OFFICE.

WILLIAM GARFIELD HOWE, OF DES MOINES, AND FRED R. WHITE, OF AMES, IOWA.

EXCAVATING MACHINE.

Application filed July 16, 1920. Serial No. 396,737.

*To all whom it may concern:*

Be it known that we, WILLIAM G. HOWE and FRED R. WHITE, citizens of the United States, and residents of Des Moines and Ames, in the counties of Polk and Story, respectively, and State of Iowa, have invented a certain new and useful Excavating Machine, of which the following is a specification.

The object of our invention is to provide an excavating machine of the type mounted on a suitable support, preferably a tractor and having a revolving drum mounted to be raised and lowered and provided with adjustable buckets capable of being adjusted to positions for operation in either direction of rotation of the drum.

A further object is to provide a novel construction of a rotating drum and buckets mounted thereon.

Still a further object is to provide in such a machine a sloping device for cutting a sloping bank.

An additional object is to provide such a sloping device capable of adjustment for cutting at different angles with relation to the surface of the ground over which the machine travels.

Still a further object is to provide in such a machine means for taking up and carrying away the dirt cut by the digging members.

With these and other objects in view our invention consists in the construction, arrangement and combination of the various parts of the device, whereby the objects contemplated are attained, as hereinafter more fully set forth, pointed out in our claims and illustrated in the accompanying drawings, in which:

Figure 1 shows a perspective view of an excavating machine embodying our invention.

Figure 2 shows a perspective view of one of the reversible buckets.

Figure 3 shows a side elevation of the machine, viewed from the opposite side to that shown in Figure 1.

Figure 4 shows a detail, sectional view taken on the line 4—4 of Figure 3.

Figure 5 shows a vertical, sectional view taken on the line 5—5 of Figure 4.

Figure 6 shows a front elevation of the frame which supports the rotatable drum.

Figure 7 shows a sectional view taken on the line 7—7 of Figure 6.

Figure 8 shows an enlarged, longitudinal, central, sectional view through the conveyor frame at one end of the excavating machine.

Figure 9 shows a detail view of part of the operative mechanism and the supporting bracket therefor.

Figure 10 shows a detail, sectional view taken on the line 10—10 of Figure 3, the end front conveyor and the sloper being shown in front elevation and the buckets being omitted.

Figure 11 shows an enlarged, sectional view of part of the structure shown in Figure 10.

Figure 12 is a detail, sectional view taken on the line 12—12 of Figure 10.

Figure 13 is a sectional view taken on the line 13—13 of Figure 10.

Figure 14 is a top or plan view of the sloper.

Figure 15 is a detail, sectional view taken on the line 15—15 of Figure 14.

Figures 16 and 17 are detail views of portions of the chains on the sloper.

Figure 18 is a sectional view taken on the line 18—18 of Figure 16 of one of the digging members on the sloper.

Figure 19 is a detail, sectional view taken on the line 19—19 of Figure 10.

Figure 20 is a perspective view of the supporting bracket for the lower end of the sloper.

Figure 21 is a perspective view of the adjustable device for mounting the lower end of the sloper.

Figure 22 is a detail, sectional view through one of the buckets and parts adjacent thereto, taken on the line 22—22 of Figure 3, illustrating the cleaner device.

Figure 23 is a sectional view taken on the line 23—23 of Figure 22.

Figure 24 is a diagrammatic view illustrating the action of the machine in making a ditch at the side of a crowned road; and Figure 25 is a sectional diagrammatic view showing the position of the machine with relation to the road surface and the bank at the side thereof.

In the accompanying drawings we have used the reference numeral 10 to indicate generally two spaced caterpillar tread devices.

The caterpillar devices 10 have the frame members 11. On the outer surface of the frame members 11 of the respective caterpillars are upright guide devices 12 arranged in pairs. There is one pair of these devices near the front of each caterpillar member, and another pair near the rear thereof.

Slidably mounted between each pair of guide devices 12 is a block 13. On each side of the machine a horizontal I-beam frame member 14 is secured to the blocks 13, as illustrated for instance in Figure 1.

At the forward ends of the frame members 14 are upright I-beam frame members 15. Inclined channel-bar frame members 16 extend from the rear ends of the frame members 14 upwardly and forwardly in the machine to the upper ends of the upright members 15.

A transverse channel bar frame member 17 connects the upper ends of the frame members 15.

For raising or lowering the respective frame members 14 with relation to each other for tilting the digging mechanism, which is supported on the frame hereinafter described, the following means have been provided.

Mounted in a screw-threaded opening in each block 13 is an upright screw-threaded shaft 18.

The screw-threaded shafts 18 have smooth portions at their ends which are mounted in bearing blocks 19 fixedly supported on the guide devices 12. On the lower ends of the respective shafts 18 are worm wheels 20.

Extending through the respective caterpillar devices 10 are shafts 21 on the ends of which are worms 22 arranged to coact with the respective worm wheels 20.

In this connection it may be mentioned that the shafts 18 at one side of the machine are provided with right-hand screw-threads, while the similar shafts on the other side of the machine are provided with left-hand screw threads, so that when the shafts 21 are rotated they will operate the shafts 18 for lowering the frame member 14 on one side of the machine and correspondingly raising the frame member 14 on the other side of the machine.

The shafts 21 are provided with gearing devices 23 by means of which power may be applied to the shaft 21 in any suitable way, and from any suitable source for operating said shafts.

Adjacent to each upright member 15 and forwardly thereof is a screw-threaded shaft 24. On the upper ends of the shaft 24 are worm wheels 25 which mesh with worms 26 on a transverse shaft 27. On one end of the shaft 27 is a gearing device 28 through which power may be applied to the shaft 27.

Extending forwardly from each frame member 15 between the ends thereof is a supporting frame member 29 for the excavating machinery hereinafter described.

Extending forwardly and downwardly from a point near the upper ends of the frame members 15 are frame members 30 which also assist in supporting the excavating machinery.

The frame members 29 and 30 are secured at their forward ends to plates 31 and 32 on the right and left-hand ends respectively of the rotary excavating device. The frame member 30 is mounted for sliding movement on the upright frame member 15 in the following manner:

On the shaft 24 is a screw-threaded block 33. The rearward ends of the frame members 29 and 30 are connected by an upright frame member 34. On the frame member 34 is an angle-iron guide 35 having one flange overlapping the I-beam frame member 15, as shown in Figure 4, and fixed to the block 33. On the block 33 is another angle-iron guide device 36 which has a flange overlapping the I-beam member 15, as shown in said Figure 4.

It will be seen that the upper end of the member 30 is thus slidably mounted on the I-beam frame member 15.

The parts are so constructed that the screw-threaded shafts 24 have considerable play in the blocks 33, so that the I-beams 15 take the strain of the support of the frame for the excavating machinery, and the rotation of the shaft 24 will raise and lower the blocks 33 and the excavating machinery frame.

The frame member 30 at the left-hand side of the machine at its forward end projects downwardly below the frame member 29, as at 37.

The lower end of the extension 37 is connected with a horizontal frame member 38 extending rearwardly in the machine. The rear ends of the frame members 29 and 38 of the left-hand side of the machine are connected by an upright channel 39.

It will be seen that there are at the opposite sides of machine, projecting forwardly from the upright frame members 15, laterally spaced frames comprising the members 30 and 29, and the plate 31 in one case, and the members 30 and 29, the plate 32 and the frame members 38 and 39 in the other case.

We will now explain the construction of the rotary excavating device which is supported on the frame structure just described.

Mounted on the plate 32 is an outwardly opening channel-shaped gear cover member 40. The channel-shaped gear cover member 40 is provided at its inner edge with a flange 41 to which is secured a laterally projecting drum section 42.

Connected with the end of the drum section 42 at its edge farthest from the gear cover or casing 40 is an annular angle-iron member 43. Spaced from the frame member 43 is a similar annular angle-iron frame member 44. Mounted in the angle-iron frame members 44 and 43 is a series of spindles 45 which support flanged rollers 46ª between the respective angle-iron members 43 and 44.

The angle-iron member 44 is connected with a drum section 42 similar to that already described, which is in turn connected with a gear casing member 46 similar to the gear cover or casing 40, with the exception that the gear cover or casing 46 has two flanges 47 similar to the flange 41.

We provide a large disc 48 which has a central opening and is mounted on the rollers 46ª. Mounted on the disc 48 adjacent to the opening in the center thereof on the opposite sides thereof are annular angle-irons 49, the edges of which furnish a wider bearing than the disc body itself for the rollers, and the outer laterally extending flanges of which overlap the drum members 42 on the outer surfaces thereof and serve as guides and supports for the discs for holding them in proper position, and also serve to engage the buckets hereinafter mentioned.

For each of the gear covers 40 we provide a disc 50 having a central opening, and provided adjacent to said central opening on opposite sides with annular rings 51 which are connected with each other and with the disc 50 by means of bolts 52. The rings 51 are provided on their inner surfaces with teeth 53, whereby internal gears are formed. The drum sections 42 may be provided with annular angle-irons 54 adjacent to the respective rings 51, as shown in Figure 11, and serve as guides or bearings. The disc 48 alternates with the disc 50, and as many discs 48 and 50 may be provided as is desired. The number provided will depend upon the length of the excavating device.

The discs 48 and 50 are connected by the rods or shafts 55 extending through the holes 56.

It will thus be seen that all of the discs are formed into a substantially rigid structure which is mounted for rotation on the rollers 46ª.

On the right-hand disc 50 are the pockets or scoops 57 which will hereinafter be referred to, and which coact with the sloper hereinafter referred to.

The upper portions of the drum sections 42 are cut away so as to form openings at its upper part for the admission of dirt. The upper portions of the gear covers 40 and 43 are removed, and portions of the annular angle irons 43 and 44 are cut away at their upper parts for leaving larger openings for dirt.

On the shafts 55 are mounted reversible buckets 58. One of these buckets is shown in perspective in Figure 2, and comprises a channel-shaped member having a bottom curved from end to end as illustrated.

The side walls of the bucket are curved away from the bottom at their central portions.

At one end of each bucket are three teeth 59, and at the other end are two teeth 59. The teeth at the opposite ends of the buckets are staggered with relation to each other.

These buckets are mounted on the shafts 55 in the following manner.

On each shaft a bucket is mounted between each alternate successive pairs of discs 48 and 50. On the next successive shaft 55 the buckets are mounted in the alternate spaces, so that the buckets on successive shafts 55 are staggered.

The buckets are arranged in sections around the drum with their edges having three teeth adjacent to each other, and with their edges having two teeth adjacent to each other. The arrangement is illustrated in Figure 1.

The buckets may be tilted and when tilted to digging position one bucket will rest near its end on the inner surface of one of the ring members 51 and against one of the angle-irons 49, while the other end will project outwardly between the discs. For reversing the buckets we have provided the following means:

On the outer ends of the shafts 55 are toothed rollers 60. A chain 61 travels on the rollers 60. It will thus be seen that when any one row of buckets is reversed the other buckets will be reversed through the action of the chain 61 and rollers 60. Mechanism may be provided for controlling the chain, or the buckets may be reversed by hand.

For imparting rotation to the drum, consisting of the drum sections 42 and parts connected therewith and to the discs we have provided the following means:

Mounted on the plate 32 in suitable bearing brackets 62 is a sleeve 63 on one end of which is a collar 64ª which may be used in shifting the sleeve longitudinally.

Received within the sleeve is a shaft 64 which extends considerably beyond the sleeve rearwardly in the machine as illustrated in Figure 3.

On the sleeve 63, near the central portion thereof, are sprockets 65 and 66. Fixed on the sleeve 63, on opposite sides of said sprockets, are drum sections 67 which are slightly tapered with curved lines toward their central portions and which go to form a two-part drum.

On the plate 31 is mounted a shaft 68 on which is a sprocket 69 in line with the sprocket 66.

On opposite sides of the sprocket 69 are drum members 70 similar in construction to the drum members 67.

Pivotally mounted on the sleeve 63 are spaced side walls 71 of a discharge or delivering conveyor.

At the outer end of the side walls 71 they are connected by a cross shaft 72 on which is a sprocket 73 in line with the sprocket 65.

A chain 74 travels on the sprockets 69 and 66 and a chain 75 travels on the sprockets 65 and 73.

On the shaft 72 on opposite sides of the sprocket 73 are drum members 67 similar to those already described.

On the forward portion of the frame of the machine is a boom structure 76 which projects over the main excavating drum which is provided with a suitable guide 77 for a cable or the like 78 by which the discharge conveyor just described may be raised or lowered.

Our machine is designed for a variety of purposes, and especially for use in road making.

In the making of ordinary roads, the standard practice requires the crowning of the road and the providing of a ditch at each side of the road. Frequently the road is lower than the surface of the ground alongside the road, and in such cases it is desirable that the bank at the side of the road be sloped slightly upwardly and away from the road at certain angles recognized by engineers as proper.

On the sleeve 63, on opposite sides of the frame members 67, are arranged two pairs of bevelled gears 106 with their faces adjacent to each other as shown in Figure 8.

Arranged at right-angles to the shaft 64 are shafts 107 extending longitudinally through the main drum of the excavating device. Each shaft 107 has at its end adjacent to the shaft 64 a gear 108 having ordinary teeth and also having bevelled teeth 109. The bevelled gear portion 109 is adapted to coact with the gears 106.

The gear 108 meshes with the end gear members 53 and on each shaft 107 is a series of gears 110 meshing with the respective gears 53 throughout the excavating device. The gears 110 project through suitable openings 111 in the gear casing members 46 and 40.

The shafts 107 are preferably journaled in bearings 112. The bearings 112 at the end of the excavator adjacent to the shaft 64 are preferably rigidly connected with the bearings 62.

The gears 106 are so arranged that by shifting the sleeve 63, which is slidably but non-rotatably mounted on the shaft 64, longitudinally, either gear 106 of each pair may be made to mesh with the respective gears 109, so that by so shifting said sleeve the shaft 107 may be made to rotate in either direction.

The sleeve 63 may be shifted by suitable shifting mechanism operatively connected with the collar 64ª. The shaft 64 extends beyond the sleeve 63 as shown in Figure 3, and has on its rearward end a worm wheel 113 which meshes with a worm 114 on an upright shaft 115, shown in Figures 3 and 7. The shaft 115 is slidably but non-rotatably mounted in a hollow shaft 116 extending upwardly and having at its upper end a bevelled gear 117 meshing with a bevelled gear 118 on a transverse shaft 119.

The shaft 119 may be rotated through a gearing device 120 from any suitable source of power.

It will be seen that the shaft 64 and the sleeve 63 may be rotated from the shaft 115, and the shaft 116, and the shaft 119, and that the operation may be carried on without interference in any of the vertically adjusted positions of the main excavating mechanism.

We have provided in connection with our excavating machine a sloping device for cutting off the sloping bank at the side of the road. The sloping device includes a supporting bracket 79 shown in Figure 20 which is secured to the drum member at one end of the machine. The bracket 79 is curved to fit the surface of the drum member 42 to which it is secured.

On the brackets 79 are upwardly extending bearing members 80. On each bearing member 80 there are formed spaced inclined shoulders 81 and 82. Pivoted to the bearing members 80 are the arms 83 of a connecting link device. The arms 83 have portions 84 extending toward each other and connected with portions 85 projecting away from the portions 84, as shown in Figure 21. Connected with the portions 85 are laterally extending portions 86 having at their ends arms 87 extending away from the arms 83, as shown in said figure.

Connected with the arms 87 is the lower end of a frame comprising a pair of channel-bars 88 arranged front to front as shown, for instance, in Figure 15.

The members 88 of the frame are suitably fastened together and at the lower end is formed a bearing for a shaft 89. At the lower end of the frame members and of the members 88 are arms 90 to which the arms 87 are pivoted.

At the upper end of the frame 88 is another shaft 91. Mounted on the frame members 88 is a channel-shaped casing 92 having inclined walls as illustrated in Figure 15. Mounted on the shafts 89 and 91 are dish-shaped sprockets 93, the peripheries of which project through slots 94 in the casing 92. On the sprockets 93 is a chain 95. On spaced links of the chain 95 are paddles 96. On other links of the chain 95 are connecting devices each comprising a yoke-shaped member 97 having arms 98 pivoted to the chain 95 and having as its side edges and at its closed end cutting edges 99.

It will be seen that the cutting device may be swung to different positions being thus reversible for proper operation in either direction of rotation of the chain 95.

The paddles 96 extend adjacent to the outer walls of the casing 92, as illustrated, for instance in Figures 10 and 19.

The chain 95 is provided with rollers 100 which travel on the outer walls of the casing 92 as shown in Figure 19.

On the spindles 101 of the rollers 100 are angle-iron guide members 102 which fit over the walls of the casing 92 and serve to hold the rollers 100 in proper position.

Connected with the frame members 88 near their upper end is a cable 103 which extends over or through a guide 104 at the outer end of the boom device 76, and is used for raising and lowering the sloper device.

The open side of the casing 42 is designed to face the bank to be cut.

Power may be applied to the shaft 91 through the pulley 91ª.

On the end of the large excavator drum and mounted on the end disc thereof adjacent to the sloper is a series of pockets or cutting members, each comprising a central triangular wall 105 which extends from the end disc near its periphery laterally from the disc and radially inwardly.

The edges of the member 105 are curved and the member 105 is generally triangular in outline, as illustrated in Figure 1.

Connected with the curved edges of the member 105 and with the end disc are walls 106ª curved somewhat like a plowshare as illustrated in Figure 1.

These pockets serve to cut the lower part of the sloping bank at the side of the wall. The part of the bank above the pockets is cut away by the sloper. It will be noted that at the beginning of the grading operation in finishing a road, the excavator will travel substantially level, but after the crowning operation has been completed, the excavator will be inclined from the center of the road laterally and downwardly at the side of the road. This makes it necessary to incline the sloper at one angle during the first part of the operation, and at another angle during the latter part of the operation.

In Figure 25 we have indicated at A the general position of the main excavating mechanism, and at B the general position of the sloper during the cutting operation before the road has been crowned. The dotted positions of parts in Figure 25 illustrate the positions of these parts during the finish of the crowning operation.

In Figures 22 and 23 we have shown a cleaner device for the buckets. Mounted on one of the angle-iron members 43 for each series of buckets 58 there is a block 121 projecting laterally and supporting a pair of tubular members 122 which are inclined from their inner ends outwardly and slightly laterally, as shown in Figure 22.

Received in the tubular members 122 are coil springs 123 which are connected with the cleaner rods 124 projecting outwardly from the tubular portions 122, and to such points as to cause their outer ends to engage the inner surfaces of the buckets for cleaning the buckets during their rotation.

We will now explain the practical operation of our improved excavating machine.

Assuming that the device is assembled and the device is ready for use and that the proper pulley is connected with the delivery working parts, it will be noted that the machine may be advanced to the place for working on the caterpillars. It will, of course, be understood that during the ordinary travel the main excavating drum is raised to its position, for instance, illustrated in Figure 3, and that the sloper may or may not be so raised. When it is desired to begin work, the main excavating drum is lowered by imparting rotation to the shafts 24 through the shaft 27 until the lower portion of the main excavating device is in position for work.

If a side bank is to be cut away, the sloper is lowered to its lower position.

When the sloper is in its lower position the arms 83 rest against the shoulder 81, and when in its raised position said arms rest against the shoulders 82.

In either of its positions the sloper coacts with the pockets 57 for cutting away a bank. The sloper is shown in Figure 10 in dotted lines for cutting away the bank at a certain desired angle when the machine is travelling on level ground. When the machine is inclined at the side of the road after the crowning has been partially or wholly completed the sloper is raised to position shown in full lines in Figure 10. When the machine is advanced on the caterpillars for excavating, rotation is imparted to the gears 53 and through the discs 50 and shafts 55 to the discs 48. It will be seen that the buckets 58 are carried around the drum of the main excavating machine.

On account of the arrangement of the teeth of the buckets the ridges left between the teeth of the first bucket will be cut away by the teeth of the next succeeding bucket.

The buckets will pick up the dirt cut by the teeth, carry it upwardly and discharge it into the endless conveyor 125, which may be of canvas, metal or any material suitable for the purpose, travelling through the main drum of the excavating device and then upwardly and around the shaft 72.

The point of discharge may be varied by raising or lowering the discharge conveyor.

Dirt cut by the cutters 97 on the sloper will slide down the sloping bank and will be dragged down by the member 96 and picked up by the pockets 57 and discharged on to the conveyor which travels through the main drum.

The machine can be caused to travel over the same ground repeatedly for lowering the surface and maintaining a side bank at the proper slope.

Attention is called to the advantage of the construction of our sloper whereby the proper slope can be cut on the side bank, and a side bank can be cut into as far as may be desired by repeated operations, and whereby the angle may be varied.

It is, of course, understood that the sloper is set at two angles to which especial attention has been called for use in ordinary road work.

Attention is also called to the fact that the buckets of the main excavator are reversible, so that the main excavator can be operated in either direction for digging. Thus the digging can be ahead of the tractor portion of the machine or behind it as may be desirable.

The buckets will never become filled with sticky material on account of the cleaner arms 124.

It will be understood that the discharge conveyor may be used for filling wagons or the like if desired.

It will be noted that the strain of the support of the excavator is taken by the upper frame members rather than by the screw-threaded shaft 24.

Some changes may be made in the construction and arrangement of the parts of our improved excavating device without departing from the real spirit and purpose of our invention, and it is our intention to cover by our claims any modified forms of structure or use of mechanical equivalents which may be reasonably included within their scope.

We claim as our invention:

1. A frame mounted on traction means, a rotary excavator device adjustably mounted at one end of said frame, said excavator device comprising rotary digging members and a central drum, said digging members being adapted to cut dirt and raise it for discharging it into said drum, a conveyor for delivering dirt from said drum, a sloper device at one end of said excavator comprising an endless member mounted for travel, cutting devices on said endless member, means for supporting said endless member at different angles with relation to the main body of said excavator, and means for picking up dirt loosened by the sloper device and discharging it into said drum on the conveyor therein.

2. In a device of the class described, a frame, a rotary digging device mounted on said frame, comprising a drum fixed on said frame and open at its upper side, a series of discs mounted for rotation on said drum, digging buckets carried by said discs, said buckets being pivotally mounted at their bottoms substantially mid-way between their ends, and being reversible, a conveyor in said drum, an operating shaft, means for connecting said shaft with said conveyor and with said discs, said device including means for reversing the direction of movement of said discs.

3. In a device of the class described, a frame, a second frame mounted for vertical sliding movement on said first frame, means for raising and lowering said second frame, a sectional drum mounted on said second frame, discs mounted between the successive sections of said drum, means for rigidly connecting said discs together, comprising shafts extended through said discs, buckets pivotally mounted between their ends at their bottom portions on said shafts, whereby said buckets may be tilted to different positions for reversing them, and means for simultaneously reversing all of the buckets.

4. In a machine of the class described adapted for surfacing and crowning roads, a traction device, a frame supported thereon, a rotary digging device mounted on said frame having reversible teeth, means for operating said digging device for rotating it in either direction, whereby it may function when the traction device is advancing and also when it is traveling backward.

5. In a machine of the class described adapted for surfacing and crowning roads, a traction device, a frame supported thereon, a rotary digging device mounted on said frame having reversible teeth, means for operating said digging device for rotating it in either direction, whereby it may function when the traction device is advancing and also when it is traveling backward, and means for tilting the digging device for effecting a crowning operation.

6. In an excavating device, a main frame, a secondary frame mounted for vertical sliding movement on said main frame, a rotary digging device mounted on said secondary frame, an operating shaft mounted on said secondary frame for rotating said digging device, a shaft mounted on said main frame, gearing devices for connecting said shafts, a third shaft slidably but non-rotatably connected with said second shaft, and supported on said main frame.

7. In a device of the class described, a main frame including upright members, a second frame mounted for vertical sliding movement on said main frame, a rotary digging device on said second frame comprising a drum fixed on said second frame open at its upper part and made in sections, discs mounted between the successive sections of said drum, for rotation, a conveyor extended through said drum, buckets mounted on said discs, an operating shaft on said drum, means for connecting said operating shaft with said conveyor, and means for connecting said operating shaft with said discs.

8. In a device of the class described, a main frame including upright members, a second frame mounted for vertical sliding movement on said main frame, a rotary digging device on said second frame comprising a drum fixed on said second frame open at its upper part and made in sections, discs mounted between the successive sections of said drum, for rotation, a conveyor extended through said drum, buckets mounted on said discs, an operating shaft on said drum, means for connecting said operating shaft with said conveyor, means for connecting said operating shaft with said discs, said means including reversing mechanism for permitting the discs to be operated in different directions.

9. In a device of the class described, a main frame including upright members, a second frame mounted for vertical sliding movement on said main frame, a rotary digging device on said second frame comprising a drum fixed on said second frame open at its upper part and made in sections, discs mounted between the successive sections of said drum, for rotation, a conveyor extended through said drum, reversible buckets mounted on said discs, an operating shaft on said drum, means for connecting said operating shaft with said conveyor, and means for connecting said operating shaft with said discs.

10. In a device of the class described, a main frame, a second frame supported thereon, a drum open at its upper portion and fixed on said second frame, rotary digging devices supported on said frame, a sloper mounted on one end of said drum and capable of movement to different positions with relation thereto, said sloper including an endless member having digger devices thereon.

11. A device of the class described comprising a rotary digging member including a fixed frame, rotary members mounted thereon, a sloper supported on said frame by means of a link device capable of being swung over center for supporting said sloper in different positions, a bracket having members thereon for engaging said link device in either of its adjusted positions, said sloper including an endless chain, means for supporting said endless chain for travel and cutter devices on said chain.

12. In a device of the class described, a rotary digging device, including a rigid frame, a sloper mounted on said rigid frame for pivotal adjustment, said sloper comprising a central, longitudinal frame, sprockets on said frame, chains on said sprockets, digger devices on said chains, and a casing, said chains having paddles for moving dirt, and adapted to travel adjacent to said casing.

13. In a device of the class described, a rotary digging device including a rigid frame, a sloper mounted on said rigid frame for pivotal adjustment, said sloper comprising a central, longitudinal frame, sprockets on said frame, chains on said sprockets, digger devices on said chains, and a casing, said chains having paddles for moving dirt, and adapted to travel adjacent to said casing, said chain and casing having coacting guide portions.

Des Moines, Iowa, April 28, 1920.

WILLIAM GARFIELD HOWE.
FRED R. WHITE.